United States Patent
Henrick

(10) Patent No.: US 6,507,727 B1
(45) Date of Patent: Jan. 14, 2003

(54) PURCHASE AND DELIVERY OF DIGITAL CONTENT USING MULTIPLE DEVICES AND DATA NETWORKS

(76) Inventor: Robert F. Henrick, 119 Woods End Dr., Basking Ridge, NJ (US) 07920

( * ) Notice: Subject to any disclaimer, the term of this patent is extended or adjusted under 35 U.S.C. 154(b) by 6 days.

(21) Appl. No.: 09/689,336

(22) Filed: Oct. 13, 2000

(51) Int. Cl.⁷ .................................. H04H 7/00
(52) U.S. Cl. ................... 455/3.06; 455/412; 705/26
(58) Field of Search .................. 455/3.01–3.06, 455/412, 418–420, 186.1; 725/91, 134; 705/26, 27, 51

(56) References Cited

U.S. PATENT DOCUMENTS

| | | | |
|---|---|---|---|
| 5,191,573 A | | 3/1993 | Hair |
| 5,440,336 A | | 8/1995 | Buhro et al. |
| 5,583,763 A | * | 12/1996 | Atcheson ................ 707/3 |
| 5,594,779 A | * | 1/1997 | Goodman ............... 455/30.4 |
| 5,727,048 A | * | 3/1998 | Hiroshima .............. 705/27 |
| 5,914,941 A | | 6/1999 | Janky |
| 5,930,765 A | | 7/1999 | Martin |
| 5,949,877 A | * | 9/1999 | Traw ..................... 705/51 |
| 5,991,737 A | * | 11/1999 | Chen ..................... 705/26 |
| 6,233,682 B1 | * | 5/2001 | Fritsch ................... 705/27 |
| 2002/0049037 A1 | * | 4/2002 | Christensen et al. ...... 455/3.06 |

* cited by examiner

Primary Examiner—Vivian Chin
Assistant Examiner—James K Moore
(74) Attorney, Agent, or Firm—Pennie & Edmonds LLP

(57) ABSTRACT

A system that facilitates the purchase and delivery of audio and video content (e.g., entertainment media) over the Internet is disclosed. In a preferred embodiment, the disclosed system allows a user who hears or sees an audio or video broadcast to use a cell phone or other wireless device to order the broadcast material, and have it remotely delivered to an independent device (e.g., the user's personal computer) without further user intervention. Thus, the system allows the user to order the desired content using a wireless device that the user will often have in his or her possession when he or she hears or sees the desired content, but to have the content delivered to a second remote device.

27 Claims, 5 Drawing Sheets

Pick Option
506

Select Station
505

Digital Cellular Handset
501

PURCHASE AND DELIVERY OF DIGITAL CONTENT USING MULTIPLE DEVICES AND DATA NETWORKS

FIELD OF THE INVENTION

The invention relates to the field of delivering digital entertainment media.

BACKGROUND OF THE INVENTION

The Internet is changing the distribution of music and video content. Recent advances in audio and video compression, higher bandwidth Internet connections, and the decreasing cost of memory have made it practical for users to download audio and video content via the Internet to personal computers and other dedicated digital devices. The downloaded content can also be transferred to CDs, mini-discs, or digital video discs and played on other audio and video devices such as MP3 players.

Typically, a user who wishes to download a particular album or video via the Internet searches for the title at a Web site, finds the title, and requests that it be downloaded. A digital file containing the requested content is then transferred to the user's computer using the File Transfer Protocol (FTP) and stored on the computer's hard disc. Even with high-speed lines, the download time may be ten minutes or more, depending on the amount and type of data requested by the user.

This practice of using the same computer to search for and then download requested content has several disadvantages. To begin with, the downloading process may occupy most or all of the bandwidth of the user's connection and may prevent or degrade simultaneous activities such as browsing or viewing a streaming multimedia program. In addition, the user is often not at his or her PC when he or she hears music or sees a video that he or she wishes to request. Accordingly, the user must later remember to download the desired material. This may require the user to write down the music title of interest on a piece of paper and save the paper until he or she logs on to the Internet.

Another alternative for downloading digital content is to download the desired content to a wireless device, such as a WAP-enabled cell phone. But this alternative also has certain drawbacks. Current wireless data networks used for cell phones, pagers, and Personal Digital Assistants (PDAs) are limited to connection rates of approximately 10 kilobits per second and lower transfer rates. Consequently, such devices are unsuitable for transferring quality media recorded in the hundreds to millions of kilobits per second range. Moreover, even if wireless-download data rates increase in the future, the cost of wireless bandwidth is likely to remain significantly higher than the cost of wired or fiber bandwidth. In addition, downloading content to the user's wireless device occupies available bandwidth and decreases the amount of data that the user may receive during the download.

SUMMARY OF THE INVENTION

The system disclosed herein facilitates the purchase and delivery of audio and video content (e.g., entertainment media) over the Internet. In a preferred embodiment, the disclosed system allows a user who hears or sees an audio or video broadcast to use a cell phone or other wireless device to order the broadcast material, and have it remotely delivered to an independent device (e.g., the user's personal computer) without further user intervention. Thus, the system allows the user to order the desired content using a wireless device that the user will often have in his or her possession when he or she hears or sees the desired content, but to have the content delivered to a second remote device.

In a preferred embodiment, the disclosed system comprises a Web site that is accessible via a digital wireless device to allow a user to request selected entertainment content for download to a second device. This system architecture makes it simple to deploy the present system as a service to be provided to users.

The user preferably pre-registers with the Web site, typically from the second device. A software agent is installed on the second device that acts as an agent for the service and facilitates downloading of requested content to the second device. In a preferred embodiment, the second device may be a personal computer owned by the user that is connected to the Internet via an always-on connection, such as a cable modem. In an alternative embodiment, the software agent may periodically dial to the Internet to check for content to be delivered. A payment arrangement may also be established during the registration process.

Once registered, the user may log on to the Web site from his or her cell phone or other wireless device (e.g., a personal digital assistant (PDA)). The service provided by the Web site is synchronized with the broadcast content of a broadcast network, such as a broadcast radio station, a cable network, or a digital satellite network. In a preferred embodiment, a user listening, for example, to a radio station may transmit a station identifier to the Web site. The Web site identifies the content currently being broadcast on the station, and then downloads a screen to the user's wireless device that displays information concerning the broadcast content and gives the user the option of downloading that content (e.g., the current song) to the second device. If the user selects this option, the Web site contacts the software agent in the second device and arranges for download and archiving of that content in that device or to another connected device or storage medium.

BRIEF DESCRIPTION OF THE DRAWINGS

These and other aspects of the invention will be better appreciated when taken in conjunction with the detailed description and accompanying drawings in which.

DETAILED DESCRIPTION OF THE PREFERRED EMBODIMENTS

Figure 1:
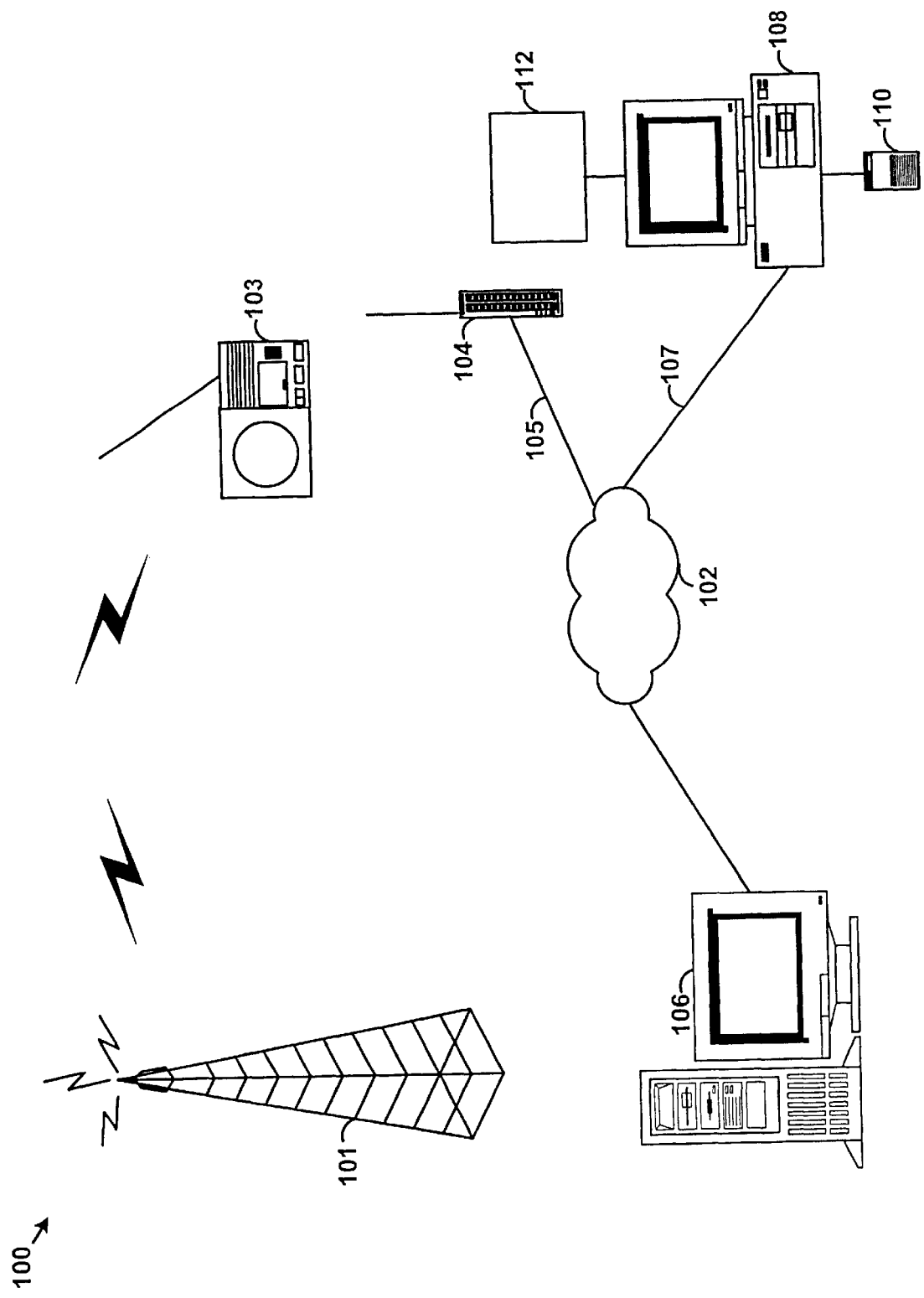
FIG. 1 is a block diagram of a preferred embodiment of a system for delivering audio content.

A preferred embodiment of a system 100 for delivering media content is shown in FIG. 1. As shown in FIG. 1, system 100 preferably comprises a broadcast radio station 101 that broadcasts music at a predesignated frequency. This broadcast signal is preferably received by a radio 103 owned by a user. The user also preferably has in his or her possession a digital cellular phone 104 that is capable of accessing the Internet 102 through a standard protocol such as WAP over a wireless connection 105. The user also preferably owns a PC 108 that may be located, for example, in the user's home or office. PC 108 is preferably connected to the Internet 102 via a wired connection 107. PC 108 is also preferably connected to a portable music device 110, such as an MP3 player. A software agent 112 is preferably downloaded and stored on PC 108, as described in more detail below.

System 100 further comprises a Web server 106 that is adapted to provide a downloading service in accordance with the present disclosure. Both cell phone 104 and PC 108 are preferably adapted to communicate with Web server 106 via Internet 102.

Operation of the present system comprises three main segments: user registration, ordering of content by the user, and delivery of the ordered content. Before describing each of these segments in detail, a brief overview of a preferred embodiment of system operation is first provided.

The user first registers and establishes an account with Web server 106 via PC 108. A software agent 112 is loaded on PC 108. Software agent 112 is adapted to facilitate downloading of content from Web server 106 to PC 108.

Subsequently, radio station 101 broadcasts a song on its predesignated frequency. The broadcast song is received and played by radio 103. If the user (i.e., the listener) wishes to purchase the song (or the album on which the song appears) for download, the user navigates to Web server 106 from his or her cell phone 104, authenticates himself or herself, and identifies the station he or she is listening to. The downloading service provided by Web server 106 then provides the user with a screen indicating the name of the song and album that he or she is listening to, as well as other information such as the group name and information related to the band. The user may then indicate through cell phone 104 a desire to buy the song or album. During and after this interaction with Web server 106, the user may continue to listen to the radio as other songs, entertainment, or advertising are broadcast.

The requested song or album is queued by Web server 106 which then contacts PC 108 without further intervention by the user. Web server 106 downloads the requested song or album to PC 108. Software agent 112 running on PC 108 facilitates this downloading and stores the received content to a mass storage device such as a hard disk. Web server 106 then bills the user's account for the cost of the song. The song or album may then be uploaded to portable music device 110.

Figure 2:
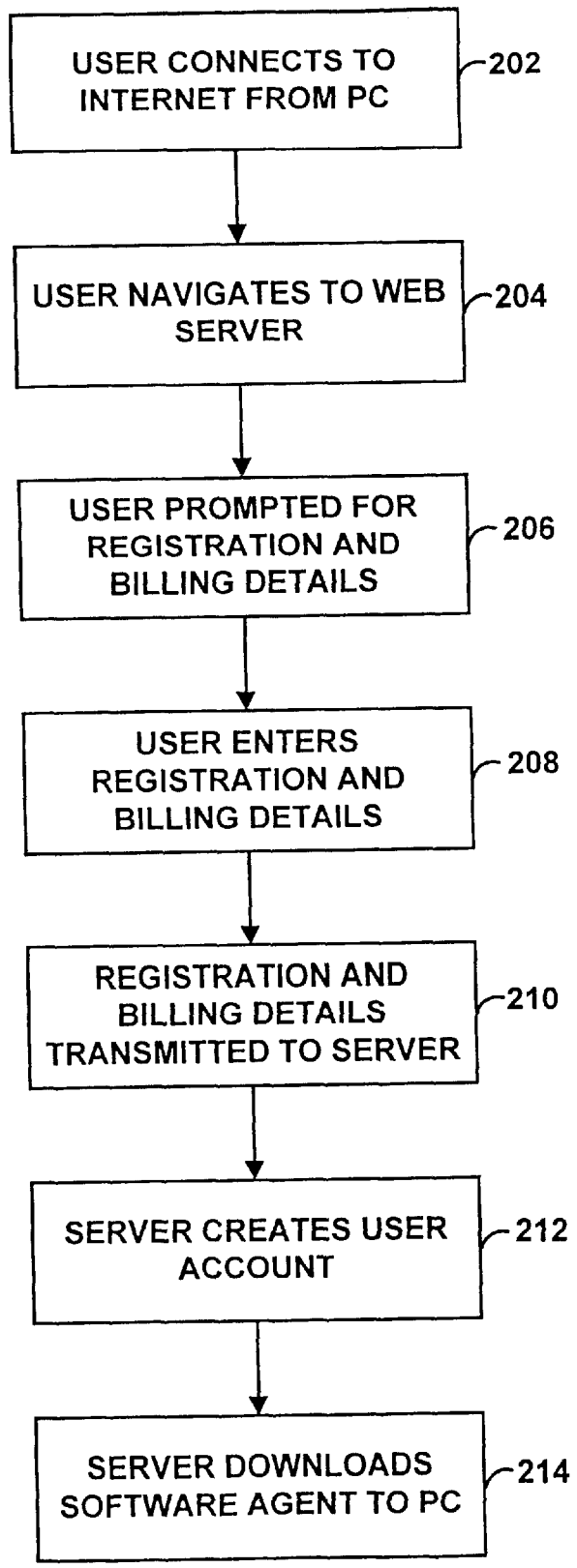
FIG. 2 is a flowchart depicting a preferred embodiment of a registration process and installation of the service client.

Each segment of system operation in this preferred embodiment will now be described in more detail. A preferred registration sequence is illustrated in FIG. 2. In step 202, the user connects to the Internet 102 from PC 108. In step 204, the user navigates to Web server 106, typically by entering a URL associated with the Web server on a command line of a browser running on PC 108. Alternatively, the user may click on a hyperlink to Web server 106 that is included in an advertisement or e-mail received by the user.

In step 206, the service prompts the user to enter his or her registration and billing information. In step 208, the user enters this information and, in step 210, transmits it to Web server 106. In step 212, Web server 106 selects a user name and password for the user and then creates an account for that user. Alternatively, Web server 106 may allow the user to create his or her own user name and password, verify that the user name is unique among existing user accounts, and then create an account for that user. The advantage of having a user create his or her own user name and password is that the user is more likely to be able to remember a user name and password that he or she created.

In step 214, Web server 106 downloads software agent 112, a thin client, to PC 108 which is stored by the PC as an executable file that is automatically run whenever PC 108 is turned on. When run, this executable file registers with Web server 106 in a manner well known in the state of the art, as for example, is done by programs such as AOL instant messaging. This allows the server to initiate a conversation with the client without intervention by the user.

Figure 3:
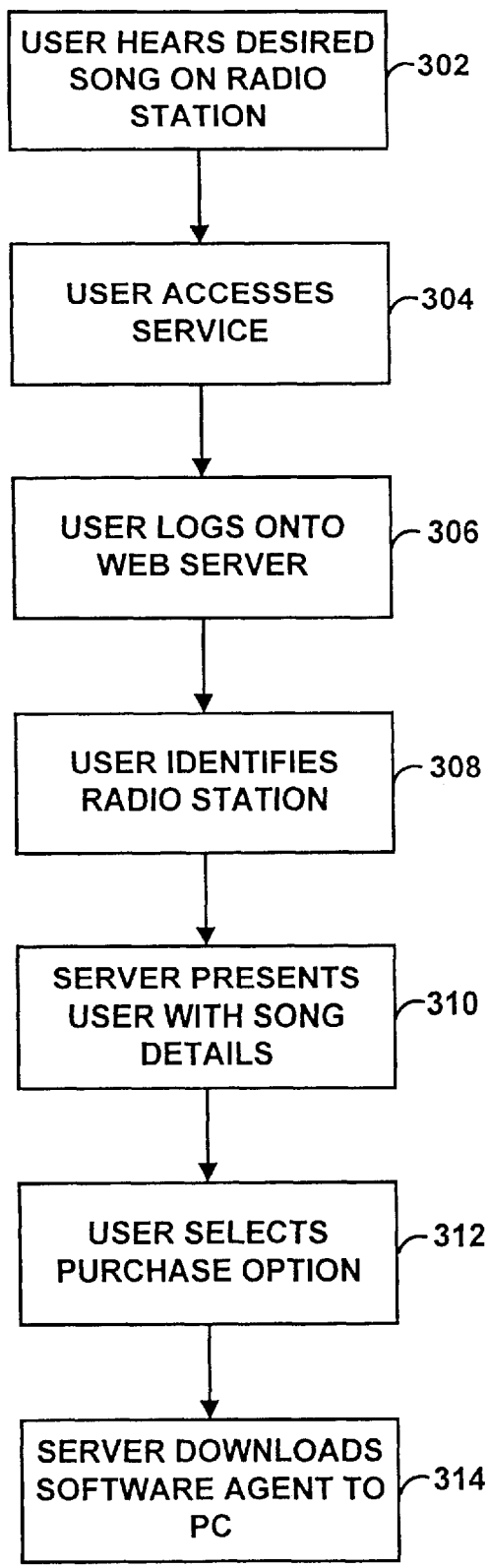
FIG. 3 is a flowchart depicting a preferred embodiment of user interaction with the system in requesting and authorizing download of content.

A preferred process for selecting a song for download is depicted in FIG. 3. As shown in FIG. 3, in step 302, the user hears a song broadcast by radio station 101 that he or she wishes to download or regarding which he or she wishes to receive further information. In step 304, the user accesses the service of the present system via digital cell phone 104 which is provided with wireless Internet-access capability. In particular, the user may navigate to Web server 106 by manually entering the URL of the service, by clicking on a hyperlink to the service, or by opening a bookmark to the service.

Figure 5:
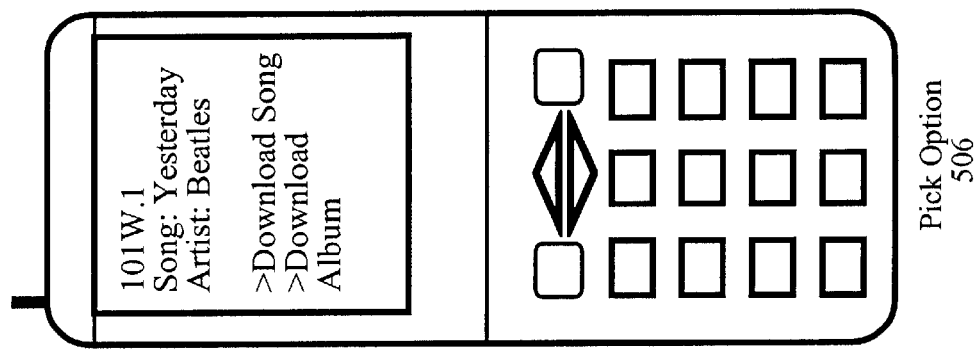
FIGS. 5A–C are illustrative examples of screens that may be displayed on a digital-cell-phone display in a preferred embodiment of the present system.
Figure 5:
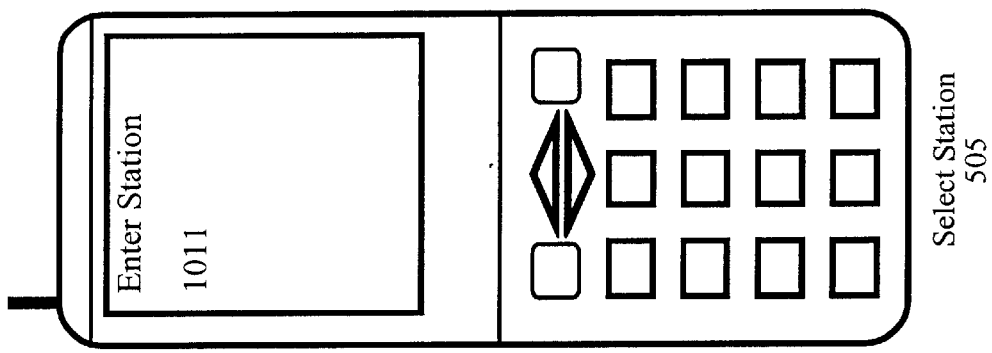
Figure 5:
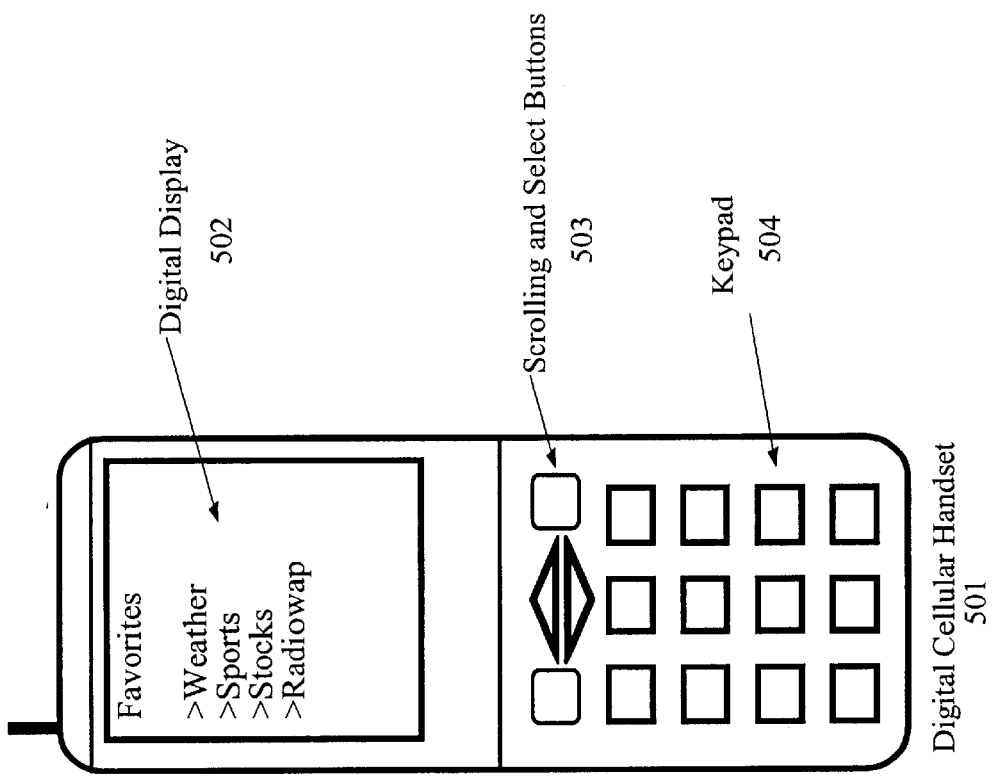

An illustrative screen display that a user might see in reaching Web server 106 by opening a bookmark is shown in FIG. 5A. As shown in FIG. 5A, digital cell phone 104 is preferably provided with a digital display 502 for displaying information, buttons 504 for scrolling and selecting displayed options, and a keypad 506 for entering information. As further shown in FIG. 5A, display 502 displays a plurality of bookmarks 508 including a bookmark "RADWAP" (TM) which, illustratively, may be the identifier for the content-download service described in the present application. The user uses buttons 504 to scroll down and select the RADWAP bookmark. Alternatively, the user accesses the RADWAP service through a voice recognition application that selects the service after the user speaks "RADWAP" into digital cell phone 104.

In step 306, the user logs on to Web server 106 by entering his or her user name and password. Alternatively, the service may permit automatic log on by identifying the user's cell phone 104 in a secure and reliable manner using security features that are part of the cell phone or network or by using a voice recognition system as described above.

In step 308, the user enters an identifier (e.g., the call letters or frequency) of the radio station to which he or she is listening. An illustrative example of how display 502 of digital cell phone 104 might appear after the user has entered the station identifier is shown in FIG. 5B. Alternatively, the user employs the voice recognition system described above or places a voice call to a human or voice response system to transmit the log on and broadcast identifier data.

In a preferred embodiment, Web server 106 tracks the songs being played on one or more radio stations in one or more geographic regions. This tracking may be achieved using the techniques described in my copending patent application Ser. No. 09/571,337, filed May 16, 2000, and entitled Enhancement of Broadcast Signals Through Automatic Signal Detection and Providing of Services Through Data Networks and Devices. Alternatively, Web server 106 may track the songs being played on a radio station in other ways such as by obtaining a copy of the station schedule.

In step 310, Web server 106 uses the information it obtains from tracking the radio station to which the user is listening to generate a screen with information such as the identity of the song, album, and artist. In addition, this screen may provide the user with one or more options. In a preferred embodiment, one of the options is to purchase the current song or album. This screen is downloaded to cell phone 104 where it is displayed to the user. An illustrative example of how this screen might appear is shown in FIG. 5C. Alternatively, song information is conveyed to the user during a voice call with a human or voice response system.

In step 312, the user selects the purchase option. In step 314, Web server 106 logs this selection. The user then returns to or continues listening to radio 103.

Figure 4:
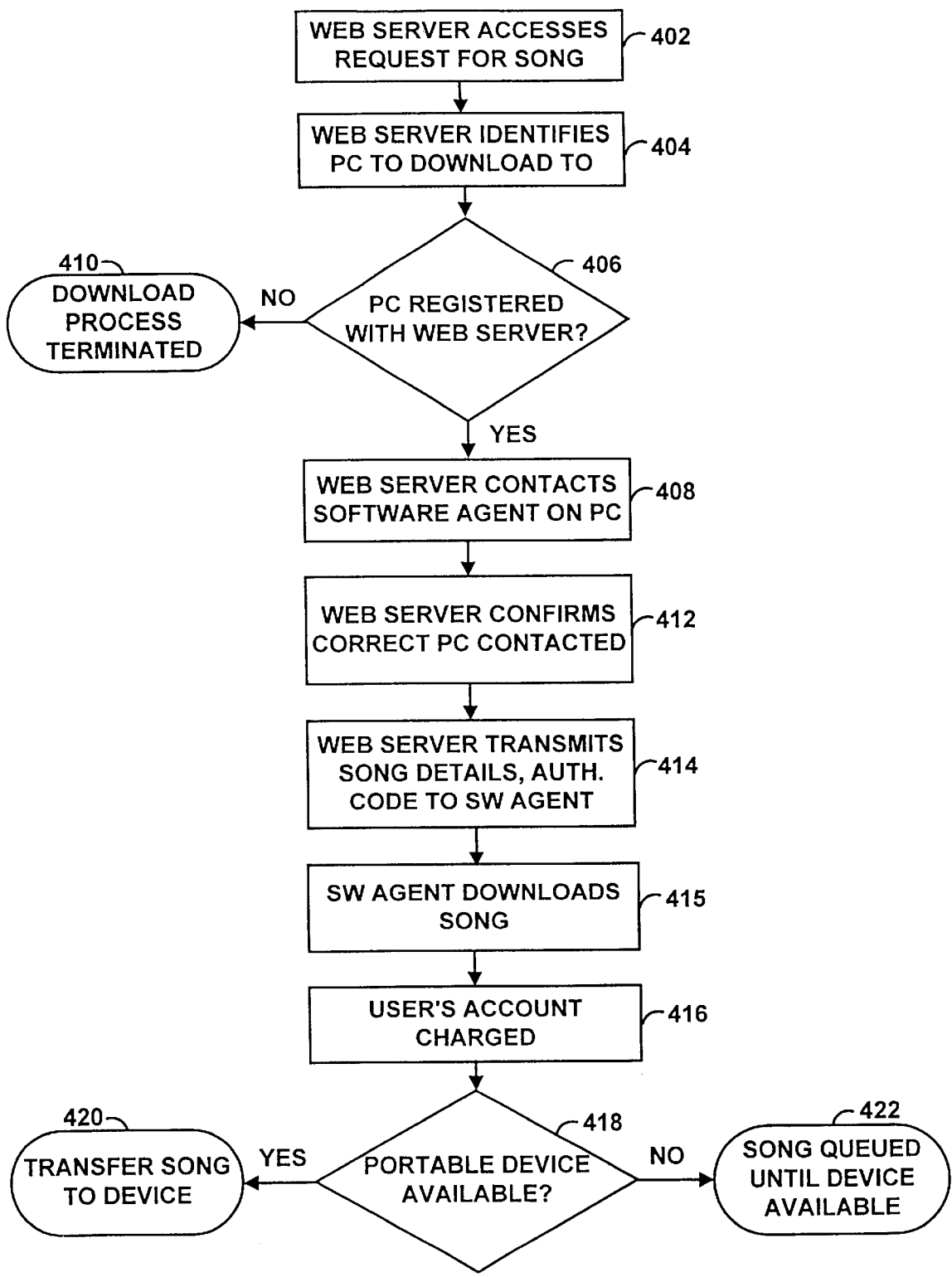
FIG. 4 is a flowchart of the server to client download of the audio content in a preferred embodiment.

A preferred process for downloading selected content to the second device is depicted in FIG. 4. As shown in FIG. 4, in step 402, Web server 106 accesses a request to purchase content from a queue of requests. In step 404, Web server 106 identifies the PC 108 to which the user wishes the requested content to be downloaded. In step 406, Web server 106 determines if PC 108 is currently registered with Web server 106, and, if so (406-Yes) contacts software agent 112 on PC 108 in step 408. If PC 108 is not registered with Web server 106 (406-No) the download process is terminated in step 410. In step 412, Web server 106 confirms that the correct client has been contacted by, for example, securely identifying PC 108.

In step 414, Web server 106 transmits to software agent 112 the name and location of the requested song, as well as an authorization code for downloading. Software agent 112 is then able to download the song, in step 415, from Web server 106 or another location authorized by the service by transmitting the authorization code to a server storing a copy of the requested song. In one embodiment, the song is downloaded from Web server 106. In another embodiment, the song is downloaded from a second server operated by the service. In yet another embodiment, the song is downloaded from a third party authorized by the service; this arrangement would be practical, for example, if the service did not itself have the desired song or content on its own servers, or if the service specialized in finding the most cost effective third party source from which to download content. Alternatively, rather than issue an authorization code to PC 108, Web server may instead simply push the requested digital content to PC 108 or issue a command to the second server or third party server to do so. Once the download is complete and verified, in step 416, the user's service account is charged and any required payments are made to the content owners or download source.

In a preferred embodiment, software agent 112 may be adapted to automatically transfer the file to another device for portability or archive. In this preferred embodiment, in step 418, software agent 112 searches for the availability of that device and, if available (418-Yes), transfers the downloaded song to it (step 420). If the device is unavailable (418-No), the file is queued until the device is available (step 422).

As will be apparent, the particular preferred embodiment described above is for a system that facilitates download of music by permitting a radio listener to order content through a cell phone with background delivery to a separate device, such as the user's home computer. It will be recognized, however, that the principles of the present invention may alternatively be applied to other environments and components.

For example, the downloaded content may be delivered to the user via an alternative broadcast network, such as digital satellite radio over a cable network or other wireless network. Alternatively, the downloaded content may be delivered via a broadband network. This may be especially appropriate in the case of digital video.

In addition, instead of digital cell phone 104, the user may alternatively interact with the service via a PDA, a dedicated music device with an Internet connection, or a PC having a wireless connection. Connection from the user's wireless device to Web server 106 may also be established via a wireless local area network or other wireless network such as a satellite network.

In an alternative preferred embodiment, rather than have the user enter an identifier for the radio station that he or she is listening to, the system may instead be adapted to receive the complete or partial name of a song, artist, or album from the user. The system may then identify one or more songs on the basis of the information entered by the user and provide an interface for selecting and ordering one or more of the identified songs, in a manner analogous to that described above.

In another preferred embodiment, a service that provides a registered community with unlimited downloads (e.g., the Napster service) may deliver the requested content, so that there is no charge for an individual download. In another preferred embodiment, the server that communicates with the user client may initiate the transfer directly to the client in a well known manner such as by FTP transfer. In another preferred embodiment, the server that communicates with the user client may multicast large amounts of audio content to multiple clients. In this embodiment, each user client preferably comprises a digital receiver for a digital media broadcast and is adapted to select and record only requested and authorized content by providing the user client with a code that permits it to decrypt and save portions of the digital media broadcast for which it is authorized. In yet another preferred embodiment, the user client may periodically connect to the Internet and check with the server to determine whether there is content for the client to download, either from the server or a third party source.

In an alternative preferred embodiment, rather than download the requested content to a PC 108, the content may instead be downloaded to a special purpose appliance intended for music download and playback with an Internet connection. In another preferred embodiment, software agent 112 may come preconfigured on the client, so that it need not be downloaded when the user registers. In another preferred embodiment, connection to the device receiving the download may be via wireless Internet connection. In another preferred embodiment, portable music device 110 may comprise digital media for recording such as a writeable CD ROM or flash memory storage suitable for use in, for example, a portable MP3 player.

In yet another preferred embodiment, the requested content is streamed, rather than downloaded, to a device specified by the user, at a time specified by the individual. This embodiment allows the individual to listen or view the requested content on demand, for a fee, and has the advantage of affording the digital content owner greater protection against unauthorized copying of the requested content.

It will be appreciated that, although the invention has been described in the context of specific illustrative embodiments, those skilled in the art will be able to devise numerous alternative arrangements which, although not explicitly shown or described herein, nevertheless embody the principles of the invention.

What is claimed is:

1. A system for the delivery of digital content corresponding to content received by a broadcast receiver in the possession of an individual, the individual also possessing a first device adapted to transmit and receive data messages and having access to a second device adapted to receive digital files, comprising:

a server having access to titles of songs included in broadcast content, and to titles of albums associated with the songs;

the first device adapted for use by the individual to interactively access the server and identify to the server a station being received by the broadcast receiver;

the server being further adapted to provide the user via the first device information concerning the broadcast song and the broadcast album;

the first device being further adapted to facilitate selection by the user of desired content from the provided information;

wherein, before the individual interactively accesses the server via the first device, the server is previously accessed by the individual from the second device to configure a software agent on the second device that is adapted to act autonomously for the user in delivering content to the second device;

the software agent on the second device being automatically initiated with initiation of the second device, and adapted to automatically register with the server upon such automatic initiation so as to be available to communicate with the server without the intervention or presence of the individual;

the server and the software agent being adapted, upon selection of desired content by the individual, to exchange information to securely identify the second device and convey authorization to have the desired content delivered to the second device without the intervention or presence of the individual; and the software agent being adapted, upon the authorization being conveyed, to facilitate the delivery and storage of the desired content without the intervention or presence of the individual.

2. The system of claim 1, wherein the first data device is a digital cell phone adapted to communicate with the server via a wireless connection.

3. The system of claim 2, wherein the wireless connection is established via a local area wireless network.

4. The system of claim 1, wherein the first data device is a PDA with a wireless connection.

5. The system of claim 1, wherein the content received by the broadcast receiver is broadcast via a digital satellite network.

6. The system of claim 1, wherein the content received by the broadcast receiver is broadcast via a cable network.

7. The system of claim 1, wherein the interactive manner in which the first device communicates with the server is via a voice telephone call.

8. The system of claim 7, wherein the voice call is taken by a human.

9. The system of claim 7, wherein the voice call is taken by a voice response system.

10. The system of claim 1, wherein selected content is downloaded through a community or subscription service that does not charge for each download.

11. The system of claim 1, wherein selected content is downloaded from a second server upon authorization.

12. The system of claim 11, wherein the second server is operated by the same entity that operates the first server.

13. The system of claim 11, wherein the second server is operated by a distinct entity from the entity that operates the first server.

14. The system of claim 1, wherein the second data device is a PC.

15. The system of claim 1, wherein the second data device is a music playback client that has connectivity to the Internet.

16. The system of claim 1, wherein the second data device is preconfigured with the piece of software before being purchased by the individual.

17. The system of claim 1, wherein the second data device communicates with the first server via a wireless connection.

18. The system of claim 1, where the second data device maintains an always-on connection to the Internet.

19. The system of claim 1, wherein the second data device periodically connects to the Internet and checks with the first server to determine whether there is content for the second data device to download.

20. The system of claim 1, wherein the server multicasts content and the second data device is provided with a code that permits it to decrypt and save a particular portion of the multicast content.

21. The system of claim 1, wherein the second data device comprises a digital receiver for a digital radio broadcast and is given instructions to save a particular song.

22. The system of claim 1, further comprising a digital recording device for recording the downloaded music.

23. The system of claim 22, wherein the digital recording device comprises a recordable CD ROM or minidisk.

24. The system of claim 22, wherein the digital recording device comprises removable FLASH memory usable in a portable MP3 player.

25. The system of claim 1, wherein the server is adapted to bill the individual for downloaded content.

26. The system of claim 1, wherein the second data device is a PC with a wired Internet connection.

27. A system for the delivery of digital content, comprising:

a broadcast receiver in the possession of an individual;

a first device in the possession of the individual and adapted to transmit and receive data messages;

a server adapted to be accessed in an interactive manner by the individual using the first device to select desired content corresponding to content received by the broadcast receiver;

a second device, comprising:

a thin client adapted to facilitate the downloading of digital content from the server by automatically interacting with the server after selection of desired content by the individual;

wherein the server is adapted to:

identify the second device from among a plurality of devices;

determine whether the second device is currently registered with the server;

if the second device is currently registered with the server, determine the name and location of the desired content selected by the individual and transmit said name and location to said thin client on said second device;

and wherein said thin client is adapted to transmit a request for said desired content using said name and location and to receive said desired content in response to said request.

* * * * *